United States Patent [19]

Sutehall

[11] 4,447,122
[45] May 8, 1984

[54] PLASTIC SHEATHED CABLES

[75] Inventor: Ralph Sutehall, Harlow, England

[73] Assignee: International Standard Electric Corporation, New York, N.Y.

[21] Appl. No.: 394,372

[22] Filed: Jul. 1, 1982

[30] Foreign Application Priority Data

Jul. 23, 1981 [GB] United Kingdom ............... 8122710

[51] Int. Cl.³ .............................................. H01B 7/02
[52] U.S. Cl. ............................ 350/96.23; 174/113 A; 174/121 A
[58] Field of Search ................. 350/96.23; 174/113 R, 174/113 C, 110 AR, 121 AR, 120 AR, 121 A

[56] References Cited

U.S. PATENT DOCUMENTS

| 1,491,265 | 4/1924 | Hopkinson | 174/110 AR |
|---|---|---|---|
| 3,823,255 | 7/1974 | La Gase et al. | 174/121 AR X |
| 4,018,962 | 4/1977 | Pedlow | 174/121 A X |
| 4,018,983 | 4/1977 | Pedlow | 174/121 A X |
| 4,064,359 | 12/1977 | Peterson | 174/121 A X |
| 4,093,342 | 6/1978 | Foord et al. | 350/96.23 R |
| 4,156,104 | 5/1979 | Mondello | 350/96.23 X |
| 4,166,670 | 9/1979 | Ramsay | 350/96.23 |
| 4,225,649 | 9/1980 | Peterson | 174/120 AR X |
| 4,304,462 | 12/1981 | Baba et al. | 350/96.23 |
| 4,312,566 | 1/1982 | Jackson | 350/96.23 |

FOREIGN PATENT DOCUMENTS

| 73390 | 6/1977 | Japan | 174/121 A |
|---|---|---|---|
| 114902 | 9/1981 | Japan | 350/96.23 |
| 2065324 | 6/1981 | United Kingdom | 350/96.23 |

OTHER PUBLICATIONS

Optical Spectra, Aug. 1979; "Fiber Optic Link for Cable Watchers".
Optical Spectra, Jul. 1976; "Fibers in the Forefront".
Bark, P. R. et al.; "Cable Design, Testing, and Installation"; International Fiber Optics and Communications; vol. 3, No. 2, Mar./Apr. 1982; pp. 22–33.

*Primary Examiner*—J. V. Truhe
*Assistant Examiner*—Morris H. Nimmo
*Attorney, Agent, or Firm*—John T. O'Halloran; Peter R. Ruzek; Mary C. Werner

[57] ABSTRACT

A plastic fiber cable has a flame retardant sheath which contains between 10–40% by weight of an inert filler, preferably titanium dioxide, which provides the sheath with thixotropic non-drip properties so that as well as possessing non-flammability properties the sheath when molten will also not drip and thus will not expose more flammable materials, such as the strands, inside the sheath.

7 Claims, 2 Drawing Figures

PLASTIC SHEATHED CABLES

BACKGROUND OF THE INVENTION

This invention relates to plastic sheathed cables, particularly cables having an outer sheath which is designed to have flame retardant properties.

Electric cables such as telephone cables are required in some circumstances to have flame retardant sheaths so that in the event of fire they do not readily burn. The cable is subject to a flammability test as laid down by the cable industry in Great Britain, and this consists of holding the cable in a flame for 15 seconds to see if it burns or not. Flame retardancy can be achieved by flame retardant additives. A typical example of a flame retardant additive is sold under the trade name Hytrel HTR 4450.

However, when the flame retardant cable sheath is subject to the flammability test, although the cable sheath does not burn, it will nevertheless melt and may expose the insulation of inner conductors which may not be flame retardant and which will thus burn.

SUMMARY OF THE INVENTION

According to the present invention there is provided a cable containing a conductor (optical and/or electrical) within an outer plastic sheath of relatively low flammability material, the outer sheath containing at least 10-40% by weight of an inert particulate filler whose particle parameters are such as to minimize dripping of the sheath when subjected to a flammability test as hereinafter defined.

Other objects, features and advantages of the present invention will become more fully apparent from the following detailed description of the preferred embodiment, the appended claims and the accompanying drawings in which:

BRIEF DESCRIPTION OF THE DRAWING

In order that the invention can be clearly understood reference will now be made to the accompanying drawing in which.

DESCRIPTION OF THE PREFERRED EMBODIMENT

Figure 1:
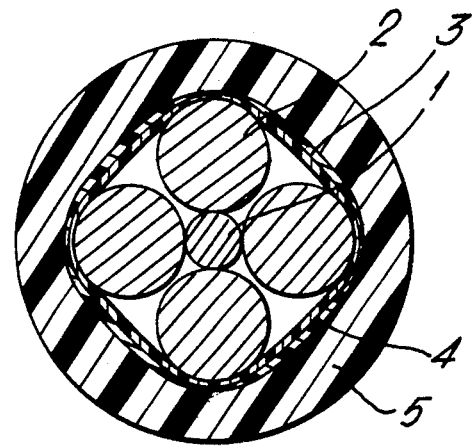
FIG. 1 illustrates an optical fiber cable having a sheath in accordance with an embodiment of the present invention, and FIG. 2 schematically illustrates a flammability testing.

Referring to the drawing, FIG. 1 shows a cable comprising a central former 1 of high-strength plastic material or of metal around which are laid four monofilament optical fibers such as 2. The fibers and central former are held together by a plastic wrapping tape 3 which, in this case, is Mylar.

Around the Mylar tape is stranded some high-strength plastic strands 4 which in this embodiment are made of a high-strength plastic material sold under the trade name Kevlar.

Around the Kevlar strands is extruded a plastic sheath 5 which in this embodiment is a polyester elastomer sold under the trade name Hytrel, in particular Hytrel 5556. The sheath material also contains a flame retardant additive, in this particular embodiment we have used Hytrel HTR 4450. The Hytrel HTR 4450 contains 10% bromine which imparts flame retardancy to the basic polymer by releasing halogens.

Figure 2:
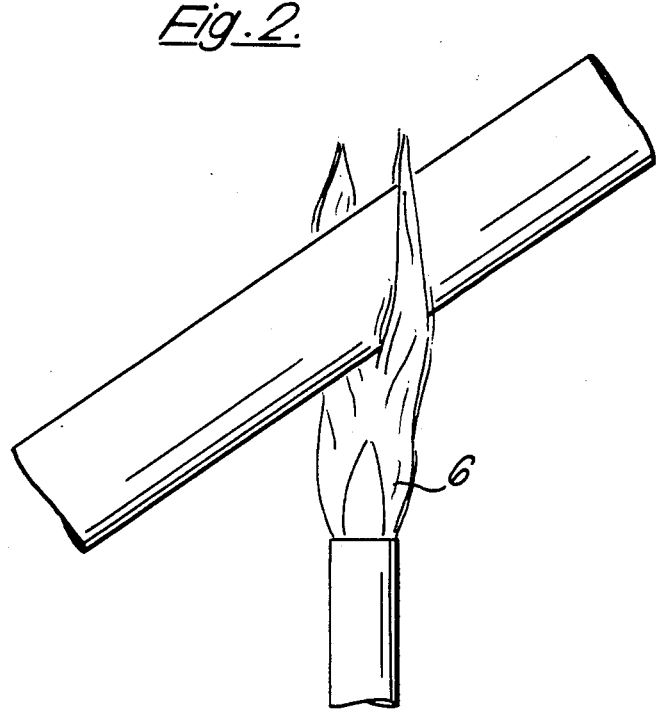

FIG. 2 shows schematically the cable of FIG. 1 undergoing a flammability test referred to herein as the test as herein defined. The cable is held at an angle of approximately 45° to the vertical in a propane flame 6 for approximately 15 seconds. This accords to a Ministry of Defense fiber optic cable flammability test. The temperature reached on the surface of the cable sheath may lie in the range of 300°-600° C. and it is a requirement that the cable sheath shall not continue to burn when it is removed from the flame. In order to meet this test the flame retardant additive, which as mentioned above is, in this particular embodiment, Hytrel HTR 4450, is incorporated in the sheath when it is extruded and basically acts as a flame retardant.

However, we have found that although the flame retardant properties of the cable are satisfactory, the sheath nevertheless melts and drips and can drip to the extent that it exposes the Kevlar strength members 4 underneath. This material burns readily and thus itself may sustain burning after the cable is removed from the flame.

Our tests have shown that if an inert filler having a suitable particle shape, range of sizes and particle size distribution, is added to the sheath, the tendency of the sheath to drip when subjected to the hot flame in the flammability test, can be significantly reduced, thus minimizing the risk of exposure of more flammable material underneath the sheath.

In the particular embodiment described we used titanium dioxide powder for this purpose and the particular sheath composition was as follows:

| | |
|---|---|
| Hytrel 5556 | 100 parts |
| Hytrel HTR 4450 (flame retardant additive) | 20 parts |
| titanium dioxide (anti-drip additive) | 20 parts | with the titanium dioxide being mixed in with the sheath compound on a suitably heated two-roll mix.

We believe the non-drip filler acts when the sheath becomes molten to maintain the sheath in a gel-like state and imparts thixotropic properties to the sheath material.

In the embodiment described we believe that the addition of titanium dioxide in the range of 10-40% by weight of the sheath material would be effective. Below 10% will, in general, not impart sufficient thixotropic properties to make a significant improvement whereas above 40% will begin to affect the physical properties of the finished sheath; for example, it will become too rigid for many applications.

In the embodiment described the sheath is extruded at a temperature of 240° C. and the melt temperature is around 200° C. The filler used to prevent or minimize dripping must be inert both chemically with respect to the chemical composition of the sheath material and it must also have a significantly higher melting point than the basic sheath material.

The density of the non-drip additive should not be significantly greater than the sheath material.

The sample of titanium dioxide which we used is sold by British Titan Products Company Limited under their code No. T, OXIDE R-CR-2. An analysis of this material gave the following:

| | |
|---|---|
| Mean particle size | = 0.22μ |
| Standard Deviation | = 0.10μ |
| Distribution | = 0.06μ to 0.53μ |

We believe the range of particle sizes which would be satisfactory would be 0 to 10μ and a mean particle size of the order of 0.5μ.

The better the non-drip additive is distributed throughout the polymer the more effective it becomes.

In the embodiment described the optical fiber cable has an outer diameter of 5 mm, the sheath thickness being of the order of 1 mm and the optical fiber package at the Mylar tape interface having an outer diameter of about 2.5 mm.

While the present invention has been disclosed in connection with the preferred embodiment thereof, it should be understood that there may be other embodiments which fall within the spirit and scope of the invention as defined by the following claims.

I claim:

1. A cable comprising:
   a conductor; and
   an outer sheath of a relatively low flammability material having incorporated therein means for substantially reducing dripping of said sheath when subjected to a flame, consisting essentially of the following constituents in the proportions by weight:

| | |
|---|---|
| polyester elastomer | 100 parts |
| flame retardant additive | 20 parts |
| titanium dioxide | from 13.3 to 80 parts |

2. The cable as claimed in claim 1 further comprising a main tensile strength member located between the conductor and the outer sheath.

3. The cable as claimed in claim 2 wherein the main tensile strength member comprises a material of a relatively high flammability.

4. The cable as claimed in claim 3 wherein the relatively high flammability material is a stranded plastic material.

5. The cable as claimed in claim 3 wherein said conductor includes
   a central former, and
   a plurality of optical fibers disposed on the outside of the central former.

6. The cable as claimed in claim 1 wherein the titanium dioxide has a particle size substantially in the range between 0 to 10μ.

7. The cable as claimed in claim 5 further comprising:
   a tape wrapping located on the outside of the fibers, the tape being disposed on the inside of the relatively high flammability material.

* * * * *